(12) United States Patent
Bordignon

(10) Patent No.: US 8,256,726 B2
(45) Date of Patent: Sep. 4, 2012

(54) HEAD FOR VIDEO-PHOTOGRAPHIC APPARATUS

(75) Inventor: Roberto Bordignon, Cassola (IT)

(73) Assignee: Lino Manfrotto + Co. S.p.A., Bassano del Grappa (VI) (IT)

( * ) Notice: Subject to any disclaimer, the term of this patent is extended or adjusted under 35 U.S.C. 154(b) by 233 days.

(21) Appl. No.: 12/835,844

(22) Filed: Jul. 14, 2010

(65) Prior Publication Data

US 2011/0017896 A1    Jan. 27, 2011

(30) Foreign Application Priority Data

Jul. 22, 2009 (IT) .............................. PD2009A0213

(51) Int. Cl.
*F16M 11/04* (2006.01)

(52) U.S. Cl. ............... 248/187.1; 248/177.1; 248/178.1; 396/419; 396/425; 396/428

(58) Field of Classification Search ............... 248/176.1, 248/177.1, 178.1, 183.1, 183.2, 183.4, 187.1; 396/419, 425, 428; 348/373; 352/243

See application file for complete search history.

(56) References Cited

U.S. PATENT DOCUMENTS

| | | | | |
|---|---|---|---|---|
| 2,429,893 | A | * | 10/1947 | Parks et al. ............... 451/369 |
| 2,615,664 | A | * | 10/1952 | Reeves ...................... 248/177.1 |
| 3,622,112 | A | * | 11/1971 | Stroh ......................... 248/181.1 |
| 4,447,033 | A | * | 5/1984 | Jaumann et al. ............. 248/563 |
| 4,525,052 | A | * | 6/1985 | Kosugi et al. ................ 396/419 |
| 4,570,887 | A | * | 2/1986 | Banister ..................... 248/187.1 |
| 4,687,165 | A | * | 8/1987 | Blackburn ................. 248/274.1 |

(Continued)

FOREIGN PATENT DOCUMENTS

EP    1386109 B1    10/2006

(Continued)

OTHER PUBLICATIONS

English translation of an Office Action issued in the corresponding German Patent Application (102010027388.0). Note: the cited art (DE 602 15 330 T2) is the Validation in Germany of EP1386109 (cited herein).

(Continued)

*Primary Examiner* — Terrell McKinnon
*Assistant Examiner* — Michael McDuffie
(74) *Attorney, Agent, or Firm* — Kristina Castellano; Castellano PLLC

(57) ABSTRACT

A support head (1) for video-photographic apparatuses (7) comprises a base (3) which can be fastened to a support structure (4) of said head (1), a platform (2, 2a) fixed rotatably to said base (3) about an axis of rotation (X), a slide (5) provided with attaching means (6) for attaching said apparatus (7) removably associable with said platform (2, 2a) so as to slide along a positioning direction (Y), a locking device (9, 10, 11, 12) for locking said slide (5) on said platform (2) in a desired position (P), and a positioning system (20) for positioning said slide (5) on said platform (2, 2a) provided with generating means (22) for generating a signal which is variable along said positioning direction (Y) and is correlated with said position (P), (and?) detector means (21) positioned on said platform (2, 2a) and capable of detecting said signal, said generating means (22) for generating a variable signal being provided on said slide (5) and configured in such a way that a specific value of said detected signal corresponds in a unique way to a specified position (P) of said slide (5) on said platform (2, 2a) along said positioning direction (Y).

21 Claims, 3 Drawing Sheets

U.S. PATENT DOCUMENTS

| | | | | |
|---|---|---|---|---|
| 4,979,709 A * | 12/1990 | Ishikawa | ............... | 248/187.1 |
| 5,170,197 A * | 12/1992 | Schmidt et al. | ............... | 396/428 |
| 5,429,332 A * | 7/1995 | Ishikawa | ............... | 248/187.1 |
| 5,623,709 A * | 4/1997 | Kaji | ............... | 396/283 |
| 5,802,412 A * | 9/1998 | Kahn | ............... | 396/427 |
| 5,838,368 A | 11/1998 | Masunaga | | |
| 6,027,258 A | 2/2000 | Ofria | | |
| 6,164,611 A * | 12/2000 | Kuhnke | ............... | 248/279.1 |
| 6,196,504 B1 * | 3/2001 | Lemke | ............... | 248/187.1 |
| 6,603,930 B2 * | 8/2003 | Suzuki | ............... | 396/144 |
| 7,431,247 B2 * | 10/2008 | Bobro | ............... | 248/178.1 |
| 7,588,376 B2 * | 9/2009 | Friedrich | ............... | 396/419 |
| 8,087,315 B2 * | 1/2012 | Goossen et al. | ............... | 74/5.22 |
| 2001/0043271 A1 | 11/2001 | Kawano | | |
| 2006/0175482 A1 * | 8/2006 | Johnson | ............... | 248/176.1 |
| 2007/0084979 A1 * | 4/2007 | Hofner et al. | ............... | 248/177.1 |

FOREIGN PATENT DOCUMENTS

| | | |
|---|---|---|
| JP | 2009111517 A | 5/2009 |
| WO | 2008017442 A1 | 2/2008 |

OTHER PUBLICATIONS

Italian Search Report issued in the corresponding Italian Patent Application PD2009A000213 (priority).

Patent Abstracts of Japan: JP2009 111517 A (Kokusai Micro Shashin Kogyosha), May 21, 2009.

Patent Abstracts of Japan: JP2005 024442 A (Fujiwara Nobuyuki), Jan. 27, 2005.

* cited by examiner

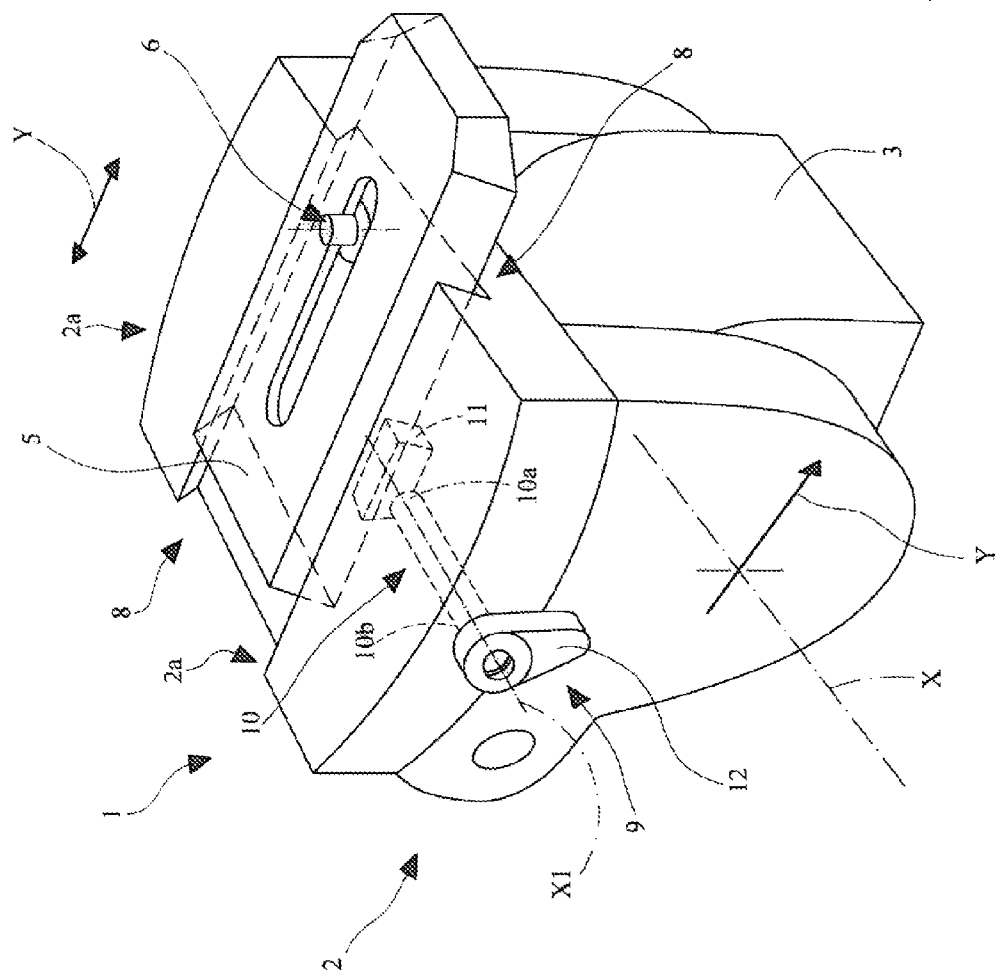

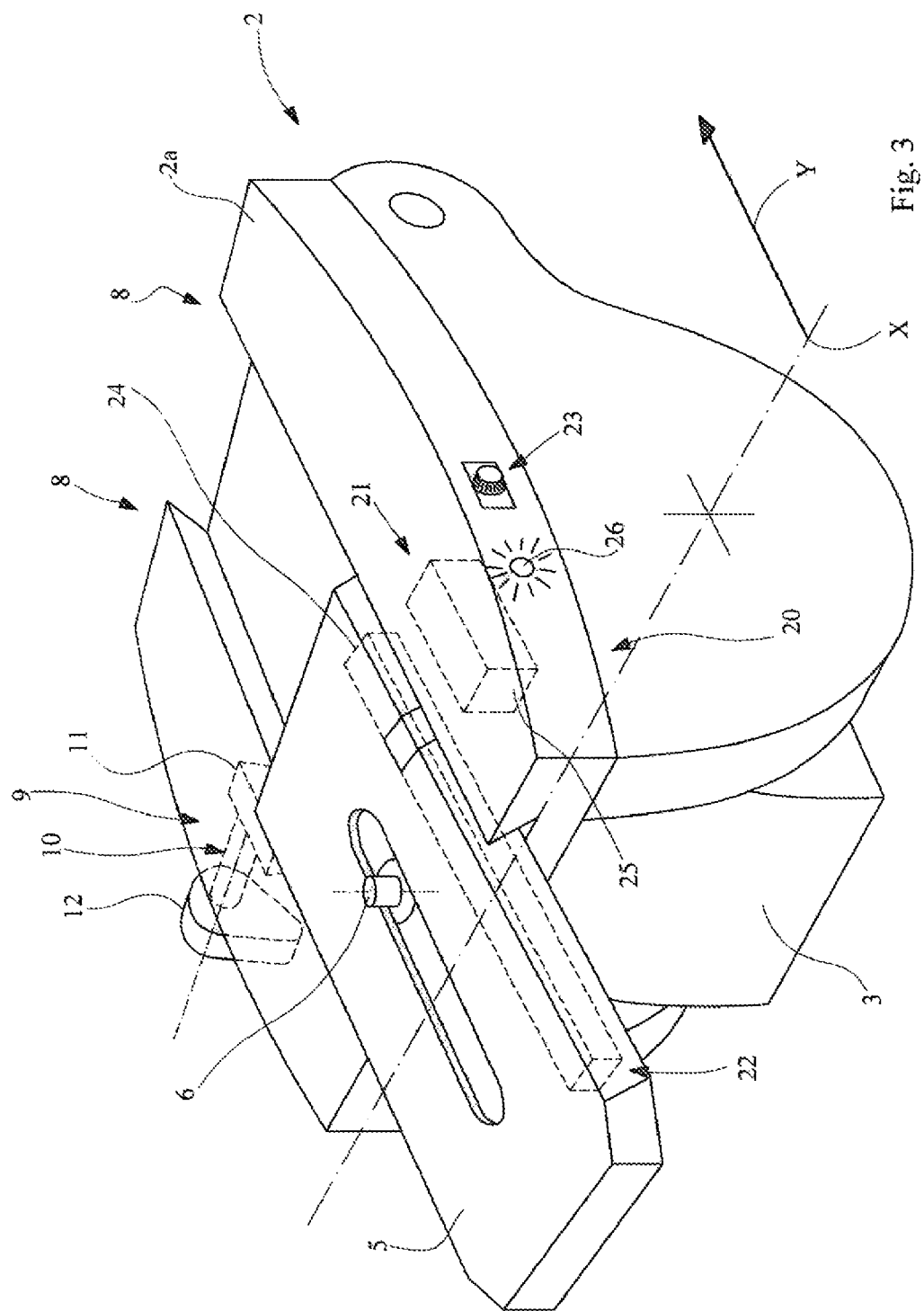

HEAD FOR VIDEO-PHOTOGRAPHIC APPARATUS

CLAIM FOR PRIORITY

This application claims the benefit of priority to Italian application PD2009A000213 filed Jul. 22, 2009, the entire contents of which are incorporated herein by reference.

FIELD

The present invention relates to a support head for video-photographic apparatuses.

TECHNOLOGICAL BACKGROUND

In this field it is known to use support heads provided with a base which is fixed, in use, to a support structure, for example a tripod, with a platform fixed rotatably to the base about at least one axis of rotation, and with a plate, movable with respect to the platform, to which the video-photographic apparatuses are removably attached.

To this end, the plate is provided with attaching means, mostly screw-type, by means of which the apparatus is attached to the plate.

One problem connected to the use of such heads is that of the correct positioning of the apparatus on the head.

The apparatuses, especially videographic apparatuses, are positioned on the head and then moved during use in order to take the shots.

The apparatus/head/tripod assembly must be stable, so as to avoid the operator having to support it, while taking the shots, in order to prevent it from rocking or tipping.

This involves considerable inconvenience for the operator, besides having a negative effect on the quality of the shots taken.

Customarily, before use, the apparatus is attached, via the attaching means, to the plate, and the latter is positioned along the platform in a position in which the aforesaid assembly is stable.

After use, it is necessary to separate the apparatus, head and tripod to place them in suitable containers in order to render their transport easier.

Since it is not possible to attach/detach the apparatus from the plate without removing it from the head, the apparatus is kept attached to the plate and the latter is separated from the platform after use. Therefore, for subsequent use, the positioning operation described above must be repeated, that is, the operator must position the plate bearing the apparatus on the platform and move it to a position in which the apparatus/head/support assembly is balanced.

This involves a considerable loss of time on the part of the operator, as well as inaccuracies of positioning because of the short time available for positioning.

At present, in order to facilitate the positioning operation, provision is therefore made to mark manually on the platform, for example with a pencil, or with adhesive strips, the desired position for the plate.

However, such an expedient is not easy, and so much the less secure, inasmuch as the signs can be erased, losing the marked position, or the marks made might not be correctly distinguishable.

SUMMARY

The principal aim of the present invention is to provide a support head structurally and functionally designed to remedy the drawbacks mentioned with reference to the prior art cited.

In particular, one aim of the invention is to provide a head configured in such a way as to facilitate the operations of positioning and balancing a video-photographic apparatus on the head itself.

Another aim is to simplify the correct positioning of video-photographic apparatuses on a support head.

These and other aims, which will become clearer in the present description, are achieved by means of a support head produced in accordance with the following claims.

BRIEF DESCRIPTION OF THE DRAWINGS

The features and advantages of the invention will become clearer from the detailed description of a preferred embodiment thereof, illustrated by way of non-limiting example with reference to the appended drawings, in which:

FIGS. 2 and 3 are two partial perspective views of the head of FIG. 1 from two different sides.

DETAILED DESCRIPTION

Figure 1:
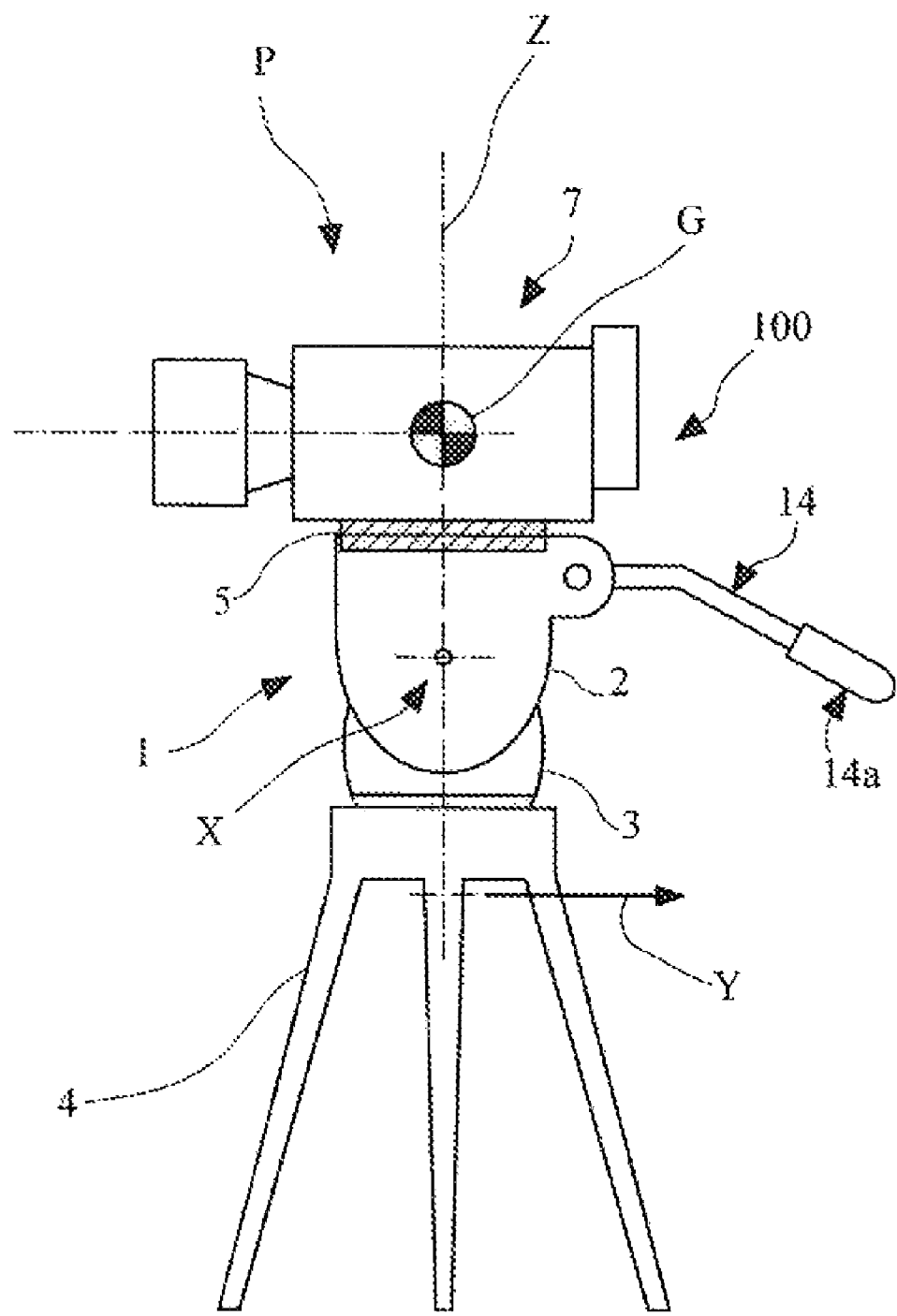
FIG. 1 is a schematic lateral view of a support head produced according to the present invention and provided with a video camera.

The drawings indicated above show a support head 1 for video-photographic apparatuses, produced according to the present invention and comprising a base 3 on which a platform 2 is articulated so as to rotate about an axis of rotation X.

The head 1 further comprises a control lever 14 fixed to the platform 2, which projects outwards from the latter and is suitable for facilitating the rotational movement of the platform 2 about the axis of rotation X.

The control lever 14 comprises a handgrip portion 14a suitable for being gripped by a user in order to orientate the platform 2.

The base 3 of the head 1 is arranged to be fastened, in such a way as to be rotatable about the vertical axis Z, to a support structure to be placed on the ground in order to take video-photographic shots, such as, for example, a tripod 4 (illustrated only schematically in FIG. 1).

The head 1 further comprises a slide 5 to which can be removably attached, via respective attaching means 6, a video-photographic apparatus, for example a video camera 7, shown in FIG. 1.

The slide 5 may be associated, in use, with the platform 2, as explained more clearly hereinafter.

On a base portion 2a of the platform 2 are defined sliding guides 8, extending in a positioning direction Y, and suitable for slidably receiving the slide 5 in such a way that it can be positioned in various operating positions on the platform 2.

The positioning direction Y is substantially perpendicular to the axis of rotation X.

The axis of rotation X is generally horizontal in order to permit the "tilt" movement of the video camera 7, though the present invention is in any case applicable to a support head comprising a platform pivotable about an axis oriented in any direction.

The head 1 further comprises a locking device 9 for locking the slide 5 on the platform 2 in a desired position and preventing unwanted movements of the slide 5 and, therefore, of the video camera 7 attached thereto, while the head 1 is in use.

The locking device 9 comprises a screw 10 extending in a threaded seat defined within the base portion 2a of the platform 2, in a transverse direction X1 with respect to the positioning direction Y of the slide 5.

The direction X1 is preferably perpendicular to the positioning direction Y and substantially parallel to the axis of rotation X.

The screw 10 is provided at its opposed ends 10a, 10b, respectively with a locking block 11 suitable for interacting with a wall portion of the slide 5 to lock the latter in a desired position on the platform 2, and with a head portion 12 positioned on the base portion 2a of the platform 2 in such a way as to be accessible to an operator, and suitable for being rotated by an operator to lock/unlock the slide 5, as explained more clearly hereinafter.

Rotating the head portion 12 causes rotation of the screw 10 in the threaded seat and consequent displacement thereof, and of the block 11 fixed thereto, in the direction X1, respectively towards/away from the slide 5.

Bringing the block 11 close to the slide 5 locks the latter in a desired position on the platform 2, and conversely, by moving the block 11 away from the slide 5, the latter can be moved along the sliding guides 8 of the platform 2 and/or removed from the platform 2.

The head 1 further comprises a positioning system 20, shown in FIG. 3 and suitable for facilitating the positioning, on the platform 2, of the assembly, indicated as a whole by 100 in the drawings, formed by the slide 5 and the video camera 7 attached thereto.

For reasons of stability, the assembly 100 is positioned in a balanced position P, shown in FIG. 1, in which, with the platform 2 in a horizontal position, the centre of gravity G of the assembly 100 is positioned along the vertical axis Z, that is, vertically above the axis of rotation X.

By shifting the centre of gravity G from said balanced position P, the assembly 100 would exert on the platform 2 and, therefore, on the tripod 4, a moment increasing progressively with the distance between the centre of gravity G and the vertical axis Z and with the weight of the video camera 7.

This moment would tend to unbalance the head 1 and the tripod 4, rendering the placing of the video camera 7 unstable.

The balanced position P depends on the dimensions and the configuration of the apparatus attached to the slide 5; in the case where a photographic camera is used, the balanced position P also depends on the lens used and on its extension with respect to the body of the photographic camera.

The balanced position P further depends on the position of the means for attaching the apparatus 6 with respect to the slide 5 and with respect to the body of the apparatus 7.

The positioning system 20 comprises generating means 22 for generating a variable signal, which are configured in such a way as to generate a signal which is monotonically variable along the positioning direction Y, the variable signal being correlated with a position of the slide 5 on the platform 2, as explained more clearly hereinafter.

The positioning system 20 further comprises detector means 21, capable of detecting the variable signal generated by the generating means 22 for generating a variable signal.

Since the signal generated by the generating means 22 varies monotonically along the positioning direction Y, there corresponds to each position of the slide 5 on the platform 2 a specific signal detected by the detector means 21, and the detected signal is therefore correlated in a unique way with the position of the slide 5 on the platform 2 along the positioning direction Y, as explained more clearly hereinafter.

The detector means 21 and the variable signal generating means 22 are preferably provided in a position in which they are substantially opposite one another.

In some versions, the generating means 22 for generating a variable signal are provided on the slide 5 and the detector means 21 are provided on the base portion 2a of the platform 2.

In the version shown in the drawings, the generating means 22 for generating a variable signal comprise a magnetic bar 24 positioned in the slide 5 and extending along the positioning direction Y, and the detector means 21 comprise an electromagnetic field detector 25 suitable for detecting the value of the magnetic field generated by the magnetic bar 24.

The bar 24 is oriented in such as way that by moving it along the positioning direction Y varies the intensity detected by the detector 25 of the magnetic field generated by the bar 24. Preferably, the bar 24 is positioned in such a way that its magnetic axis, ideally joining the south pole and the north pole of the bar 24, is substantially parallel to the positioning direction Y.

Since the detected intensity of the magnetic field varies monotonically from the south pole to the north pole, the intensity value of the magnetic field detected depends in a unique way on the position of the slide 5 with respect to the platform 2.

In other versions which are not shown, the generating means 22 for generating a variable signal may comprise any other element for generating a detected electromagnetic field which is variable along the positioning direction Y.

The positioning system 20 further comprises a storing device 23 for storing a signal detected by the detector means 21, that is, a specified position of the slide 5 on the platform 2.

The presence of the storing device 23 facilitates the subsequent positioning of the slide 5 on the platform 2 in the previously stored position, customarily the balanced position P, as explained more clearly hereinafter.

The storing device 23, provided on the base portion 2a of the platform 2 in a position such as to be accessible to an operator, may also act as a device for switching on the positioning system 20.

In a version of the head 1 which is not shown, a switching on device separate from the storing device 23 may be provided.

The positioning system 20 further comprises a processing device, not shown in the drawings, suitable for receiving the position signal detected by the detector means 21 and the signal stored by the storing device 23, in order to compare the current position, that is, the position detected by the detector means 21, with the position stored by the storing device 23, that is, the balanced position P.

The processing device may be positioned, for example, in the platform 2.

The processing device, as well as being operatively connected to the storing device 23, is also operatively connected to a signalling element 26 of the positioning system 20 which is suitable for emitting a warning signal to advise the operator of the approach of the slide 5 to a desired position on the platform 2. The warning signal emitted by the signalling element 26 depends on the distance between the detected position and the stored position P, in such a way as to guide the operator when positioning the slide 5 on the platform 2.

The signalling element may comprise an optical signalling means, for example an indicator lamp 26, as in the version shown in the drawings.

The indicator lamp 26 may flash with a luminosity and/or flashing frequency which varies according to the distance between the detected position of the slide 5 and the stored position P thereof.

In versions which are not shown, the signalling element may comprise an acoustic signalling device suitable for emitting a sound whose frequency varies according to the distance between the detected position and the stored position P.

Alternatively, the signalling element may emit a sound or light up only when the previously stored position is reached.

In a version which is not shown, the positioning system 20 comprises a display element operatively associated with the detector means 21 and with the storing device 23 and suitable for displaying the distance between the current detected position of the slide 5 and the previously stored position P.

The operator, reading the distance displayed on the display element, moves the slide 5 into the position in which a distance equal to "0" is displayed on the display element. This facilitates the positioning of the slide 5 on the platform 2.

The positioning system 20 further comprises a reference element, not shown in the drawings, suitable for detecting the presence of the slide 5 in the sliding guides 8 of the platform 2 and, consequently, permitting the functioning of the positioning system 20, in the manner explained hereinafter.

The reference element may comprise a pin or another mechanical reference element movable in the presence of the slide 5 in the sliding guides 8.

In another version, the reference element comprises a further magnetic field detector positioned on the platform 2 and spaced apart from the detector 25 along the positioning direction Y by a distance having a desired length.

Such positioning of the reference element with respect to the detector 25 makes it possible to solve any ambiguity regarding the position signals detected by the detector means 21.

At a specified position of the slide 5 on the platform 2, the intensity of the magnetic field detected by the detector 25 has a value equal to "0". However, the detector 25 detects a magnetic field intensity "0" also when the slide 5 is not on the platform 2, that is, when the bar 24 is sufficiently far away from the detector 25.

The presence of the reference element makes it possible to distinguish the two aforesaid positions in which a magnetic field of intensity "0" is detected.

When the slide 5 is separated from the platform 2, both the detector 25 and the further detector detect a magnetic field intensity equal to "0", but conversely, when the slide 5 is on the platform 2, at least one of the detector 25 and the further detector detects a magnetic field having an intensity other than "0".

In the first case, with the slide 5 separated from the platform 2, the further detector does not permit the functioning of the positioning system 20, while in the second case permission is given and the detection of the corresponding position can be carried out and therefore the slide 5 can be positioned as desired.

In other versions which are not shown, the generating means 22 for generating a variable signal may be of the optical type and the detector means 21 then comprise an optical detector.

For example, the generating means 22 for generating a variable signal may comprise a coloured strip whose colour varies monotonically along the positioning direction Y, or an optically readable code, that is, capable of being read by an optical reading device.

The optically readable code may for example be a strip provided with a bar code having alternating dark and light bars whose thickness and/or spacing varies along the positioning direction Y, or a light bar with dark marks in specified zones thereof, or vice versa.

In the case where optically readable codes are used, as detector means 21 optical reading devices are used which are suitable for recognising the optically readable codes used, for example a laser reading device, of the type used for optical reading, or a microvideo camera.

In the aforesaid cases, the positioning system 20 may comprise a light source suitable for emitting a light signal towards the strip, which is capable of reflecting said light signal at least partially towards the detector means 21, the latter comprising an optical detector for detecting the optical signal reflected by the strip and the light intensity of which depends on the section of the strip affected by the reflected optical signal.

The reflected optical signal then depends on the position of the slide 5 on the platform 2, therefore, in this case also, the detector means 21 detect a signal dependent in a unique way on the position of the slide 5.

Alternatively, as stated, the detector means 21 comprise a video camera which focuses on and shoots a particular portion of the coloured strip, or of the optically readable code, emitting or making available a signal dependent in a unique way on the position of the slide 5 on the platform 2.

Similarly, with other optically readable systems a signal is made available which is dependent in a unique way on the position of the slide 5 on the platform 2.

In other versions which are not shown, the generating means 22 for generating a variable signal comprise an element with variable geometry having a dimension monotonically variable along the positioning direction Y, the detector means 21 comprising a device suitable for detecting the variation of the aforesaid dimension and, therefore, the position of the slide 5 on the platform 2.

In this case the detector means 21 comprise a detector which sends a signal dependent on the distance between the portion of the element with variable geometry affected by said return signal and the detector means 21.

For example, the element with variable geometry may comprise a groove provided in an edge portion of the slide 5 and which, in use, faces towards the detector means 21, and is shaped in such a way that its depth, that is, the distance from the detector means 21, varies monotonically along the positioning direction Y.

Alternatively, an edge portion of the slide 5 may have a thickness which is monotonically variable along the positioning direction Y, the detector means 21 being such as to detect such a variation in thickness and to emit a corresponding position signal.

In another version, the detector means 21 comprise a feeler element, for example a feeling wheel fixed to the platform 2 in a position such as to be rotated by frictional force by the edge of the slide 5 as a result of movement thereof.

The detector means 21 further comprise a detector, for example a counter suitable for detecting the position of the wheel and therefore of the slide 5 in the platform 2.

Optionally, the edge of the slide 5 may be provided with a plurality of alternating projections and recesses, the projections being suitable for engaging with suitable portions of the wheel in order to move it in rotation as a result of a movement of the slide 5 in the sliding guides 8.

In one version, a potentiometric wheel may be used.

In each case, moving the slide 5 along the positioning direction Y causes rotation of the feeling wheel and therefore of the signal detected by the detecting means.

In use, after having attached the video camera 7 to the slide 5, the operator switches on the positioning system 20 and positions the slide 5 on the sliding guides 8, thus actuating the reference element which permits the functioning of the positioning system 20.

The operator then moves the slide 5 in the positioning direction Y until it is positioned in the balanced position P, shown in FIG. 1.

This position is stored by means of the storing device 23 which, as stated, stores a particular signal detected by the detector means 21.

By acting on the locking device 9, the slide 5 is locked in the aforesaid balanced position P.

After use, the operator separates the slide 5 from the platform 2, replacing the various components in containers for transport.

On subsequent use of the video camera 7 with the head 1, the operator switches on the positioning system 20, positions the slide 5 on the sliding guides 8, actuating the reference element, and moves the slide 5 until the previously stored position is reached, that is, the balanced position P, being guided in this operation by the signalling element 26 and/or the display element.

Therefore with the positioning system 20, the positioning of the apparatus in the balanced position P becomes simple and instantaneous.

In versions which are not shown, provision may be made for storing a plurality of balanced positions, for example relating to different slide/video-photographic apparatus assemblies, for example when the same head is used with apparatuses different from one another which therefore have different balanced positions on the head 1 itself.

In this case provision may be made for retrieving, via suitable selection means, the desired position, previously stored for each apparatus, in such a way as to position, via the positioning system, each apparatus in a balanced position on the head 1.

In a version which is not shown, on the sliding guides 8 a lighting device may be provided, for example one or more luminous LEDs, suitable for illuminating the sliding guides in order to facilitate the position of the slide 5 on the guides 8 themselves.

Such a lighting device is particularly useful, especially in the case of use at night or in poor lighting conditions.

In one version, the positioning system 20 is connected to the slide 5 and removably associable with the platform 2 so as to be able to use the same positioning system 20 with different heads 1.

In other words, the apparatus 7 to be positioned is fixed to the slide 5, which is provided with the generating means 22 for generating a variable signal and is operatively connected to the detector means 21 and to the storing device 23.

In use, the detector means 21 and the storing device 23 are associated with a platform 2 in a desired manner suitable for allowing their use with a head for video-photographic apparatuses.

To this end, the platform 2 or a portion of the head is provided with a container, configured for example as a drawer, shaped in such a way as to receive the detector means 21, the storing device 23 and the signalling element 26, if provided.

The positioning system of the invention makes it possible to carry out in a rapid and repeatable manner the stable positioning of a video-photographic apparatus on a support head.

Although the invention has been described in example embodiments, those skilled in the art will appreciate that various modifications may be made without departing from the spirit and scope of the invention. It is therefore to be understood that the inventions herein may be practiced other than as specifically described. Thus, the present embodiments should be considered in all respects as illustrative and not restrictive. Accordingly, it is intended that such changes and modifications fall within the scope of the present invention as defined by the claims appended hereto.

I claim:

1. A support head for video-photographic apparatuses, comprising
    a base which can be fastened to a support structure of said head,
    a platform fixed rotatably to said base about an axis of rotation (X),
    a slide provided with attaching means for attaching said camera, the slide being removably associable with said platform in such a way as to be slidable along a positioning direction (Y), and
    a locking device for locking said slide on said platform in a desired position (P),
    further comprising a positioning system for positioning said slide on said platform, the positioning system being provided with generating means for generating a signal which is variable along said positioning direction (Y) and is correlated with said position (P), and detector means which can detect said signal, said generating means for generating a variable signal being configured in such a way that a specific value of said detected signal corresponds in a unique way to a specified position (P) of said slide on said platform along said positioning direction (Y), said positioning system further comprising a storing device for storing one or more values of said detected signal in order to store said position (P) of said slide on said platform.

2. The support head according to claim 1, wherein said positioning system further comprises a processing device capable of receiving said position signal detected by said detector means and said signal stored by said storing means in order to compare said detected position with said stored position (P), and a signalling element connected to said processing device in order to emit a warning signal dependent on the distance between said detected position and said stored position (P).

3. The support head according to claim 2, wherein said signalling element is an indicator lamp flashing at a frequency which varies according to said distance.

4. The support head according to claim 2, wherein said signalling element is a flashing indicator lamp whose luminosity varies according to said distance.

5. The support head according to claim 2, wherein said signalling element is an acoustic signalling device which emits a sound whose frequency varies according to said distance, or which emits a sound when said distance is approximately zero.

6. The support head according to claim 2, further comprising a display element connected to said processing device to display a distance between said detected position and said stored position (P).

7. The support head according to claim 1, wherein said generating means for generating a variable signal comprise a magnet which generates a magnetic field which varies monotonically along said positioning direction (Y), said detector means comprising a magnetic field detector for detecting the magnetic field generated by said magnet.

8. The support head according to claim 1, wherein said variable signal generating means comprises an optically readable code, said detector means comprising an optical reading device for reading said code.

9. The support head according to claim 8, wherein said optically readable code comprises an optical strip whose colour varies monotonically along said positioning direction (Y).

10. The support head according to claim 8, wherein said optically readable code comprises a bar code provided on said slide and having alternating dark and light bars whose thickness and/or spacing varies monotonically along said positioning direction (Y).

11. The support head according to claim 8, wherein said optical reading device comprises a video camera for reading said optically readable code.

12. The support head according to claim 8, wherein said positioning system further comprises a light source provided on said platform for emitting a light signal, said optically readable code being capable of reflecting said light signal, said optical reading device detecting an optical signal which is reflected from said optically readable code and whose light intensity depends on the section of said code struck by said light signal.

13. The support head according to claim 1, wherein said variable signal generating means comprise an element with variable geometry having at least one dimension monotonically variable along said positioning direction (Y), said detector means comprising a sensor for detecting a variation of said dimension along said positioning direction (Y).

14. The support head according to claim 1, wherein said detector means are positioned on said platform and said variable signal generating means are positioned on said slide.

15. The support head according to claim 1, wherein said variable signal generating means comprise an edge of said slide capable of moving a feeler element by contact following a movement of said slide on said platform along said positioning direction (Y) so as to generate a detected signal which depends uniquely on the position of said slide along said positioning direction (Y).

16. The support head according to claim 15, wherein said feeler element comprises a feeling wheel which can be rotated by the frictional force generated by the pushing of said edge of said slide against said feeling wheel.

17. The support head according to claim 15, wherein said edge of said slide is provided with a plurality of alternating projections and recesses, said projections being configured so as to move said feeler element as a result of a movement of said slide on said platform along said positioning direction (Y) so as to generate a detected signal which depends uniquely on the position of said slide (5) along said positioning direction (Y).

18. The support head according to claim 15, wherein said feeler element comprises a feeling wheel which can be rotated by said projections.

19. The support head according to claim 15, wherein said detector means comprise a counter for detecting the position of said feeler element and consequently the position of said slide along said positioning direction (Y).

20. The support head according to claim 1, and further comprising a reference element for detecting the presence of said slide on said platform and for consequently enabling the operation of said positioning system.

21. The support head according to claim 20,
wherein said generating means for generating a variable signal comprise a magnet which generates a magnetic field which varies monotonically along said positioning direction (Y), said detector means comprising a magnetic field detector for detecting the magnetic field generated by said magnet,
wherein said reference element comprises a further magnetic field detector positioned on said platform and spaced apart from said magnetic field detector along said positioning direction (Y).

* * * * *